United States Patent
Iyer et al.

(10) Patent No.: US 11,677,773 B2
(45) Date of Patent: Jun. 13, 2023

(54) PRIORITIZED REMEDIATION OF INFORMATION SECURITY VULNERABILITIES BASED ON SERVICE MODEL AWARE MULTI-DIMENSIONAL SECURITY RISK SCORING

(71) Applicant: BMC Software, Inc., Houston, TX (US)

(72) Inventors: G S Narayan Iyer, Houston, TX (US); Ajoy Kumar, Santa Clara, CA (US); Amit Gupta, Needham, MA (US)

(73) Assignee: BMC Software, Inc., Houston, TX (US)

( * ) Notice: Subject to any disclaimer, the term of this patent is extended or adjusted under 35 U.S.C. 154(b) by 1144 days.

(21) Appl. No.: 16/194,735

(22) Filed: Nov. 19, 2018

(65) Prior Publication Data

US 2020/0162497 A1 May 21, 2020

(51) Int. Cl.
    *H04L 29/06* (2006.01)
    *H04L 9/40* (2022.01)

(52) U.S. Cl.
    CPC ........ *H04L 63/1433* (2013.01); *H04L 63/164* (2013.01); *H04L 63/20* (2013.01)

(58) Field of Classification Search
    CPC ... H04L 63/1433; H04L 63/164; H04L 63/20; G06F 21/577; G06F 2221/034
    See application file for complete search history.

(56) References Cited

U.S. PATENT DOCUMENTS

| | | | | |
|---|---|---|---|---|
| 7,278,163 | B2* | 10/2007 | Banzhof | H04L 63/1433 |
| | | | | 717/173 |
| 7,890,869 | B1* | 2/2011 | Mayer | G06F 21/577 |
| | | | | 709/224 |
| 8,132,260 | B1* | 3/2012 | Mayer | H04L 67/125 |
| | | | | 726/25 |
| 8,495,747 | B1* | 7/2013 | Nakawatase | G06F 21/577 |
| | | | | 726/25 |
| 8,984,643 | B1* | 3/2015 | Krisher | H04L 63/1433 |
| | | | | 726/25 |
| 9,692,778 | B1 | 6/2017 | Mohanty | |
| 10,735,451 | B1* | 8/2020 | Baker | H04L 63/20 |
| 10,848,515 | B1* | 11/2020 | Pokhrel | H04L 63/1416 |

(Continued)

FOREIGN PATENT DOCUMENTS

WO    2007027131 A2    3/2007

OTHER PUBLICATIONS

Gillin, BMC upgrades toolset for mapping massive IT data centers, Feb. 2016.*

(Continued)

*Primary Examiner* — Minh Dinh
(74) *Attorney, Agent, or Firm* — Brake Hughes Bellermann LLP (57) ABSTRACT

A method for securing a service implemented on a computer network includes identifying network assets in the computer network used by the service. The method further includes identifying vulnerabilities in one or more of the network assets, determining an asset risk score for each of the network assets, and determining a service risk score for the service. The method involves implementing one or more vulnerability remediation actions on the computer network to reduce the service risk score and secure the service.

21 Claims, 4 Drawing Sheets

(56) References Cited

U.S. PATENT DOCUMENTS

| | | | |
|---|---|---|---|
| 2010/0043074 A1* | 2/2010 | Scates | G06Q 10/0637 |
| | | | 726/25 |
| 2010/0192228 A1* | 7/2010 | Levi | G06F 21/577 |
| | | | 726/25 |
| 2013/0074188 A1* | 3/2013 | Giakouminakis | G06F 21/577 |
| | | | 726/25 |
| 2013/0096980 A1 | 4/2013 | Basavapatna et al. | |
| 2013/0191919 A1 | 7/2013 | Basavapatna et al. | |
| 2017/0286690 A1* | 10/2017 | Chari | G06F 21/577 |
| 2018/0137288 A1* | 5/2018 | Polyakov | G06F 21/577 |
| 2019/0052665 A1* | 2/2019 | Mahieu | G06N 3/04 |
| 2020/0012796 A1* | 1/2020 | Trepagnier | G06N 3/08 |

OTHER PUBLICATIONS

Extended European Search Report for European Application No. 19208368.1, dated Jan. 7, 2020, 7 pages.
Communication pursuant to Article 94(3) EPC for European Application No. 19208368.1, dated Oct. 27, 2021, 5 pages.

* cited by examiner

PRIORITIZED REMEDIATION OF INFORMATION SECURITY VULNERABILITIES BASED ON SERVICE MODEL AWARE MULTI-DIMENSIONAL SECURITY RISK SCORING

This description relates to securing computer networks and resources used to provide services.

BACKGROUND

Businesses and organizations rely more and more on networked computer systems for information and services. The computer systems can include computing devices such as computers and smartphones, databases or data stores, as well as computer networks such as private and public networks (including the Internet). In computer networking, a network service ("Information Technology" (IT) service) is an application running at the network application layer (and above) that provides data storage, manipulation, presentation, communication or other capability. An IT service may be implemented using a multi-tier architecture such as, for example, a web-tier, an application tier, and a database tier, with each tier providing compute and/or storage services. Each IT service is usually provided by a server component running on one or more computers (often a dedicated server computer offering multiple services) and accessed via a network by client components running on network endpoint devices, such as desktop or laptop computers, or portable devices like tablets and smart phones.

IT services that are commonly provided on computer networks include, for example, directory services, e-mail services, file sharing, instant messaging services, online gaming services, printing, file server services, voice over Internet Protocol (VoIP) services, video on demand, video telephony, World Wide Web access, simple network management protocol (SNMP), time services, wireless sensor network services, business applications, etc.

A computer security "vulnerability" may be a weakness, exposure, or gap in a computer system that can be exploited by threats by an unauthorized third party to gain unauthorized access to the computer network or to the network assets. Establishing good computer security (which may include processes and mechanisms by which equipment, information, and services are protected from unauthorized access, changes, or destruction) is essential for secure operation of a computer network. Software, hardware, and firmware vulnerabilities pose a critical risk to any organization operating a computer network, and can be difficult to categorize and mitigate.

In traditional threat and vulnerability management (TVM), security alerts reporting vulnerabilities (identified, for example, by a vulnerability name or nomenclature matching application) may be sent to various stakeholders (e.g., application owner/users, security teams, system administrators, agents, etc.) who may be affected by, or can act on, the reported vulnerabilities. The stakeholders may be, for example, organizational entities (e.g., IT administrators) or machine entities (e.g., other computing devices, services, or software modules), which have been granted privileges to access parts of the computer network to correct or mitigate the reported vulnerabilities. Correction or mitigation of a vulnerability may include, for example, blocking access to, blocking operation of, patching, replacing, or removing the vulnerable service component. Correction or mitigation of the vulnerability may also include scanning the computer system for viruses or other malware that may have been introduced, and removing the viruses or other malware.

Consideration is being given to systems and methods for mitigating security risks for IT services implemented on a computer network.

SUMMARY

A computer network implements a secure IT service.

In a general aspect, the computer network includes network assets including computing devices each having at least one processor and at least one memory.

A computing device hosts a security risk solution application that includes a service model module and a security tools data module. The service model module identifies network assets in the computer network used by the service. The service model module also identifies dependencies of the network assets in the computer network. The security tools data module receives data identifying vulnerabilities in one or more of the network assets. Each vulnerability may have one or more vulnerability risk dimensions. Identifying vulnerabilities in one or more of the network assets includes determining a risk value for each vulnerability risk dimension. Determining a risk value for each vulnerability risk dimension includes using information obtained from one or more network security tools coupled to the computer network.

The computing device also includes a risk score calculator and a prioritization simulator. The risk score calculator determines an asset risk score for each of the network assets used by the IT service based on the risk values of the vulnerability risk dimensions of the vulnerabilities of the network asset. The risk score calculator further determines a service risk score for the IT service based on the determined asset risk scores of the network assets, for example, by aggregating the asset risk scores of the individual network assets used by the IT service.

The prioritization simulator prioritizes and implements one or more vulnerability remediation actions on the computer network to secure the service. For this purpose, the prioritization simulator simulates effects of different vulnerability remediation actions on the service risk score, and prioritizes implementation of a vulnerability remediation action that has a larger simulated reduction in the service risk score over implementation of other vulnerability remediation actions that have smaller simulated reductions in the service risk score.

The details of one or more implementations are set forth in the accompanying drawings and the description below. Other features will be apparent from the description and drawings, and from the claims.

DETAILED DESCRIPTION

A computer network (e.g., a public cloud, a private cloud, or an on-premise system) can host one or more services ("IT services"). The computer network may encompass or include a variety of hardware, software and firmware components ("assets") used to implement an IT service. The assets used to implement the IT service may include, for example, one or more servers (e.g., web servers, application servers, etc.), databases, software code, network components, applications, and other services.

A computer security "vulnerability" is a weakness, exposure, or gap in a computer network or computing device that can be exploited by threats (e.g., an unauthorized third party) to gain unauthorized access to an asset in the computer network or computing device.

An information security vulnerability can be defined as a security flaw or weakness in a computer network's or computing device's design, implementation, or operation and management. The security flaw or weakness may be exploited to violate the computer network's or computing device's security policy and compromise security for the computer network or computing device. A vulnerability can create a possible path or means by which a malicious actor can gain unauthorized access to a computer network or computing device. The vulnerability may be a state in a computer network or computing device (or set of networks or devices) that, for example, either allows an attacker to execute commands posing as another user, allows the attacker to access data that is contrary to the specified access restrictions for that data, allows the attacker to pose as another entity, or allows the attacker to conduct a denial of service attack, etc. Common vulnerabilities include, for example, operating system (O/S) flaws (e.g., default permits), infected Internet sites (e.g., web sites containing malicious spyware/adware which could infect computers and collect personal information. etc.), flaws in software code (e.g., unchecked user inputs that may result in buffer overflows or SQL injection), password management flaws (e.g., acceptance of weak passwords that can be discovered by brute force attacks), and software bugs (e.g., computer viruses that allow the attacker to misuse the infected computer).

Most businesses or organizations recognize a need for continually monitoring their computer networks and computing devices to identify assets at risk not only from known vulnerabilities but also from newly reported vulnerabilities (e.g., due to new computer viruses or malicious programs). Identification of vulnerable software allows prophylactic actions to be taken, for example, to secure the vulnerable software and prevent breaches of computer security. The prophylactic action may include inserting changes in the code of software programs running on the computer networks or computing devices (e.g., patches or bug fixes) that are designed to update, fix, or improve the vulnerable software programs. Other prophylactic actions may include, for example, deploying specific anti-virus software and/or restricting operation of the vulnerable software to limit damage. The prophylactic actions may also involve hardening of systems by, for example, using best security practices for configuring the systems for their intended use (e.g., enabling services).

Under the Common Vulnerabilities and Exposure (CVE) initiative and other such industry initiatives, an information security "vulnerability" is defined as a flaw in software code or configuration that can be directly used by an attacker to gain access to a system or network. Further, under the CVE and other such initiatives, an information security "exposure" is defined as a system configuration issue or a flaw in software that allows access to information or capabilities that can be used by an attacker or hacker as a stepping-stone into a system or network. A system configuration issue or a flaw may be a security exposure if it does not directly allow compromise, and is a violation of a reasonable security policy. An information security "exposure" describes a state in a computer network or computing devices (or set of networks or devices) that is not a vulnerability, but (a) allows an attacker to conduct information-gathering activities, (b) allows an attacker to hide activities, (c) allows the computer network or computing device to behave as expected, but is compromising such network or device, (d) is a primary point of entry that an attacker may attempt to use to gain access to the system or data, or (e) is considered a problem according to some reasonable security policy.

Vulnerability scanning tools (e.g., tools that are commercially available in the TVM space) may be used to identify vulnerabilities in computer systems that can be exploited by malicious actors. These vulnerability scanning tools can scan and report on information security vulnerabilities of different types (e.g., computer networks' or computing devices' O/S, applications, software code, and policy violations vulnerabilities). Some of the commercially available vulnerability scanning tools (e.g., Qualys, Nessus, Rapid7, etc.) focus on reporting about vulnerabilities on computer network's or computing devices' O/S, core software, and application vulnerabilities. Other tools (e.g., Whitehat, Sonatype, CheckMark, etc.) focus on reporting about software code vulnerabilities. Yet other tools (e.g., SecOps Policy, etc.) focus on reporting computer or software mis-configurations that are against company or regulatory policies. These vulnerability scanning tools may be used to identify vulnerabilities relating to mis-configured assets or flawed software that resides on a computer network's asset, such as a firewall, router, web server, application server, etc.

The computer systems of an organization may have thousands of vulnerabilities (and even millions of vulnerabilities in large environments) at any given time. Not all vulnerabilities are, or can be, remedied immediately in a running computer system without prior testing in a development or quality assurance environment. Vulnerability remediation may involve shutting down or interrupting the computer network's or computing device's operation. Traditional techniques for TVM may involve installing patches in the computer networks and computing devices on a periodic maintenance schedule (e.g., a monthly or quarterly patching schedule) for the computer system. The traditional TVM may involve using numerical Common Vulnerability Scoring System (CVSS) scores to assess the severities of the identified vulnerabilities, and prioritizing remediation (i.e., installing patches) of a few of the vulnerabilities according to their CVSS scores.

While a CVSS score can capture the principal (technical) characteristics of a vulnerability in an asset and produce a numerical score reflecting its severity, the CVSS score does not account for the importance or relevance of the particular vulnerable asset in the context of the IT service, and does not account for the importance or relevance of the IT service to the business goals, business processes, business applications, etc. of the IT service provider. Further while the CVSS score can provide a one-dimensional view (i.e., the technical characteristics) of the vulnerability of an asset, the CVSS score does not consider the impact of other aspects or dimensions such as policy violation, indicators of compromise (IOC), applications' vulnerabilities, and other threats associated with assets that pose a security risk to the IT service.

Each IT service may have its own importance in the IT service provider's business. Breach or unavailability of any particular IT service amongst several IT services may result in different degrees of business risk for the IT service provider. Prioritizing remediation of a few of the vulnerabilities according to their CVSS scores does not consider the impact on the business risks of the IT service provider of low-scoring vulnerabilities, which may not be remediated in a timely manner because of the low CVSS scores. Further, each IT service involves multiple network assets, such as web servers, application servers, database servers, and network devices, etc. Prioritizing remediation of a few of the vulnerabilities based on merely the one-dimensional CVSS scores ignores the impact of asset vulnerabilities on the non-technical aspects of providing the IT service. For example, in an IT service such as an on-line credit card payment service, an application server may be responsible for credit card processing, and a database (DB) server may hold personally identifiable information (PII) or medical records. Both these servers may have vulnerabilities with "medium" CVSS scores, and may have policy violations of mandatory Payment Card Industry (PCI) standards or mandatory Health Insurance Portability and Accountability Act (HIPPA) regulations. Under a typical CVSS score-based prioritization approach to remediation, the two servers having only medium CVSS score vulnerabilities may not be timely remedied, and thus the IT service may remain active even with critical policy or regulatory violations on the two servers.

Such a situation (i.e., rendering an active IT service with unacceptable threat exposure caused by critical policy or regulatory violations) may be avoided by considering overall service security risk as a criterion for prioritizing vulnerability remediation. Considering the IT service's security risk may allow tagging the two servers as having high-service-risk vulnerabilities (i.e. policy or regulatory violations) for immediate or priority remediation to provide a compliant on-line credit card payment service on the application or DB servers.

Systems and methods (collectively "service security risk solutions") for assessing and prioritizing mitigation of security risks of an IT service are disclosed herein. The disclosed solutions take a multi-dimensional view of vulnerabilities of the assets used by the IT service. The IT service may combine processes and functions of software, hardware, and networks. The IT service may be implemented over a computer network involving a variety of assets including, for example, servers, databases, software applications, and network components. The security risk of the IT service can be a function of vulnerabilities of the individual network assets, and the threats that can exploit the vulnerabilities of such assets.

In example implementations, a service security risk solution may generate a security risk score ("asset risk score") for a network asset as a function of the threat vulnerabilities associated with the network asset, the threat agents involved, and the impact of a successful malicious exploit of a vulnerability by an attacker on the IT service goals of the service provider. For purposes of generating asset risk scores, the service security risk solution may consider the network asset's vulnerabilities to include software vulnerabilities (i.e., vulnerabilities that can be remedied by code patches or fixes), system configuration vulnerabilities (i.e., vulnerabilities that can be remedied by system reconfigurations, such as server hardening, closing or opening ports, etc.), and security policy violation vulnerabilities (i.e., vulnerabilities that can be remedied by applying policy controls, etc.).

Further, the service security risk solution may generate a service risk score that is a normalized aggregate of the risk scores of the individual network assets used by, or associated with, the IT service.

In example implementations, the service security risk solution may receive or prepare a service model (e.g., service model 200, FIG. 2) identifying and describing the network assets used by the IT service. The service model may identify the particular assets (e.g., servers, databases, and software applications) utilized or accessed by the IT service and also include or describe the logical dependencies between the particular assets (e.g., servers, databases, and software applications) utilized or accessed by the IT service.

The service security risk solution may generate the service risk score for the IT service based on consideration of different aspects or dimensions of the IT service including, for example, the importance of an individual vulnerable network asset within the IT service model from a business perspective, the importance of the IT service to which the vulnerable network asset belongs, current security controls for the IT service as a whole (such as having an Intrusion Prevention System and/or Web Access Firewall in front of the IT service as a whole, and not merely security controls for individual network assets), and consideration of aspects, such as application security (appsec) vulnerabilities, indicators of compromise (IOCs), malware, policy violations, and configuration weakness.

The service security risk solutions described herein can make the service model underlying the service risk score visible to IT administrators (who may be responsible for vulnerability remediation), for example, on a computing device's display. The IT administrators can utilize the service security risk score (and the individual network assets' risk scores) in conjunction with the service model for risk prioritization, remediation of the vulnerabilities, and post-remediation testing of the IT service.

Figure 1:
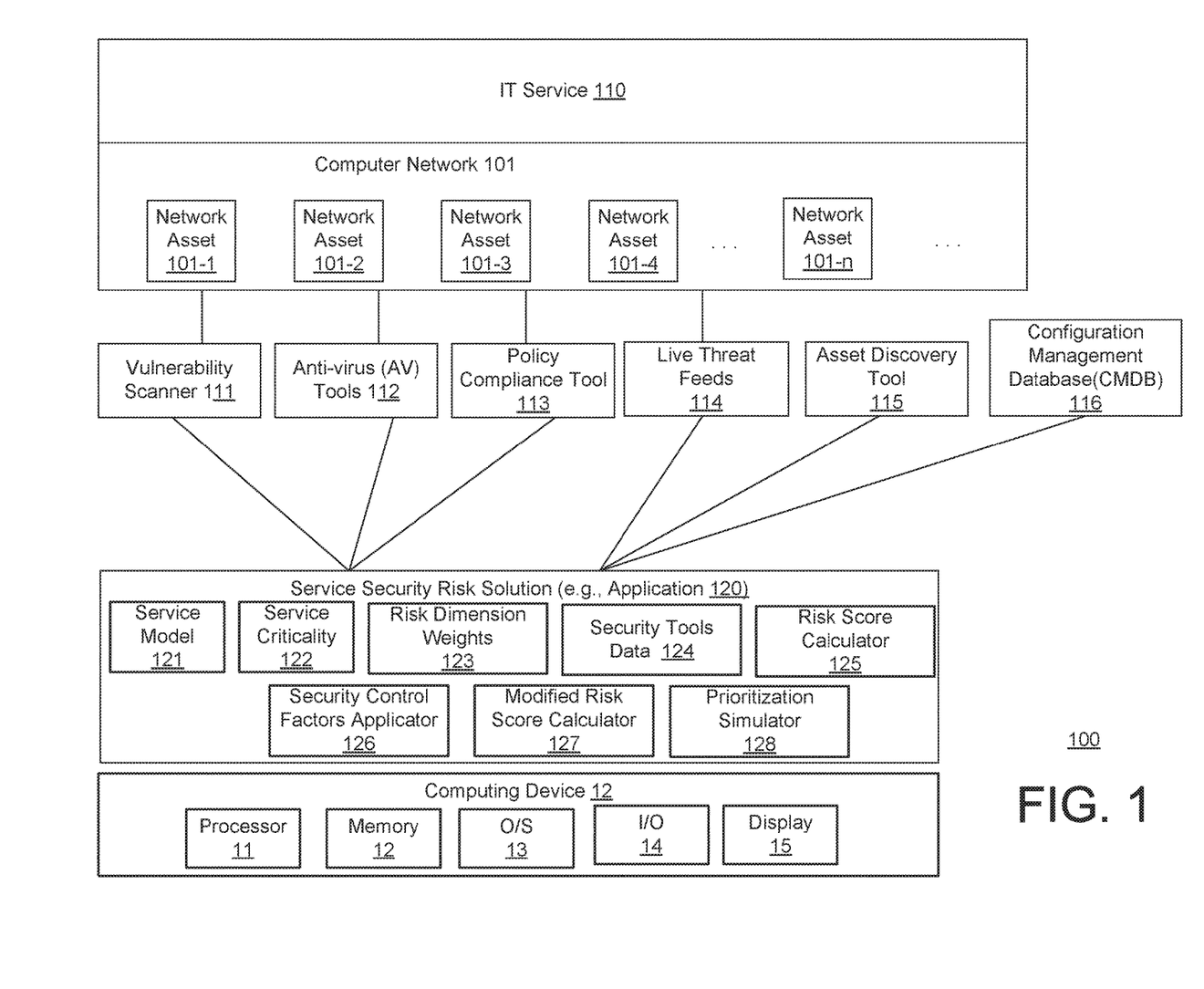
FIG. 1 is a schematic block diagram illustration of an example system for implementing an example security risk solution for mitigation of security risks of an IT service, in accordance with the principles of the present disclosure.

FIG. 1 is a block diagram of an example system 100 for implementing an example service security risk solution for assessing, and prioritizing mitigation of security risks of an IT service (e.g., IT service 110), in accordance with the principles of the present disclosure.

IT service 110 may be hosted on a computer network 101, which includes one or more network assets (e.g., network asset 101-1, network asset 101-2, network asset 101-3, network asset 101-4, . . . network asset 101-n, etc.). IT service 110 may use or require only a subset of the one or more network assets of computer network 101 for service operation. While one IT service 110 is shown in FIG. 1, other IT services (not shown) using one or more of the same assets as IT service 110 may be concurrently implemented on computer network 101.

Computer network 101 may be coupled to one or more vulnerability and threat detection tools (e.g., vulnerability scanner 111, anti-virus (AV) tool 112, policy compliance tool 113, live threat feeds 114, etc.), and to asset discovery tools and asset identification resources (e.g., asset discovery tool 115, configuration management database (CMDB) 116, etc.).

In system 100, the service security risk solution for assessing and prioritizing of security risks of IT service 110 may be implemented via application 120, which may, for example, be hosted on one or more physical or virtual computers (e.g., a computing device 10 that, for example, includes a processor 11, a memory 12, an O/S 13, an input/output port (I/O) 14 and a display 15) coupled to computer network 101.

In example implementations, application 120 may be configured to assess service security risks based on a multi-dimensional view of vulnerabilities in the network assets used by IT service 110. One or more of the vulnerability and threat detection tools (e.g., vulnerability scanner 111, antivirus (AV) tool 112, policy compliance tool 113, live threat feeds 114, etc.) coupled to computer network 101 may correspond to a respective dimensional view of vulnerabilities in the network assets, and provide to application 120 vulnerability information about the multi-dimensional view of vulnerabilities in computer network 101.

Application 120 (e.g., hosted on computing device 10) may include one or more modules (e.g., service model module 121, service criticality module 122, risk dimension weights module 123, security tools data module 124, risk score calculator 125, security controls factor module 126, modified risk score calculator 127, and prioritization simulator 128, etc.) for processing the received vulnerability information and generating prioritization schedules for remediation of the vulnerabilities in the network assets used by IT service 110.

The functions and operations of the one or more modules 121-128 may be configured to implement the steps (e.g., steps 310-380) of a method (e.g. method 300, FIG. 3) for prioritizing remediation of the vulnerabilities in the network assets used by IT service 110.

Application 120 may generate a security risk score of a network asset ("asset risk score") as a function of the threat vulnerabilities associated with the network asset, the threat agents involved, and the impact of a malicious exploit of the vulnerability by an attacker on the IT service's goals of the service provider. For purposes of generating asset risk scores, application 120 may consider "vulnerabilities" to include software vulnerabilities (i.e., vulnerabilities that can be remedied by code patches), system configuration vulnerabilities (i.e., vulnerabilities that can be remedied by system reconfigurations, such as server hardening, closing of network ports, etc.), and security policy violation vulnerabilities (i.e., vulnerabilities that can be remedied by policy remediation).

Further, application 120 may generate a service risk score of IT service 110 that is a normalized aggregate of the asset risk scores of the assets in computer network 101 associated with IT service 110.

In example implementations, service model module 121 in application 120 may receive, or prepare, a service model (e.g., service model 200, FIG. 2) of the network assets used for IT service 110. The service model may include the logical dependencies between the network assets (e.g., servers, databases and software applications) utilized or accessed by IT service 110.

In example implementations, module 121 may use a network asset discovery tool to scan computer network 101 and obtain information on, and dependencies of, the particular network assets (e.g., software, hardware, network, storage, and services) used by IT service 110. The network asset discovery tool may, for example, be a cloud discovery tool, such as BMC Discovery (which pings IP addresses of assets in the network for automated asset discovery and application dependency mapping).

Figure 2:
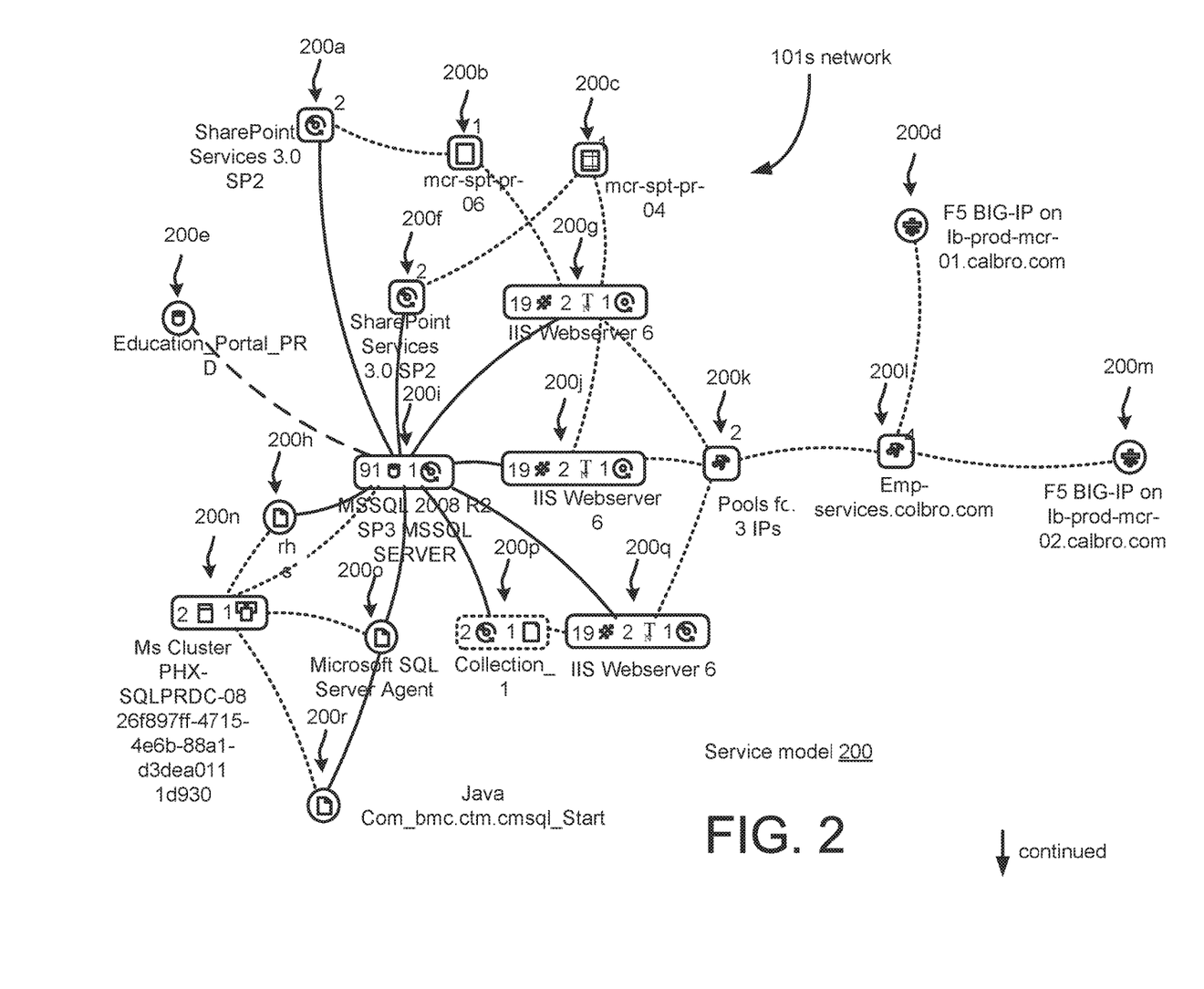
FIG. 2 is an illustration of an example service model describing network assets used by the IT service, in accordance with the principles of the present disclosure.

Service model module 121 may, for example, further use an asset identification resource (e.g., a configuration management database (CMDB)) to identify the assets in computer network 101 and create a service model (e.g., model 200) by tagging the identified assets in computer network 101 that belong to, or are used for, IT service 110.

FIG. 2 shows an example service model 200 of the particular network assets used by IT service 110, in accordance with the principles of the present disclosure. For the example shown in FIG. 2, IT service 110 may be, for example, an education portal service implemented on network 101. Further, the particular network assets used by IT service 110 may be a subset of the network assets (network asset 101-1, . . . network asset 101-n) of computer network 101. The particular network assets used by IT service 110 and their dependencies may be depicted in service model 200 as a sub network (e.g., network 101s) of computer network 101. Each of the particular network assets that is used (or can be used) by IT service 110 may be represented by a node (e.g., nodes 200a-200r) in network 101s (as shown in FIG. 2). Each connecting edge between any two nodes in network 101s may represent a dependency of the respective assets that are tagged at the two nodes. For purposes of illustration, these connecting edges are shown in FIG. 2 by bold, dashed or dotted lines.

Application 120 may generate the service risk score for IT service 110 based on consideration of different dimensions of the service including, for example, the importance, from a business perspective, of an individual network asset within the service model (e.g., service model 200), the importance of the service which uses the network assets, current security controls for the service as a whole (and not merely security controls for individual network assets), and consideration of aspects such as application security (appsec) vulnerabilities, indicators of compromise (IOCs), malware, policy violations, and configuration weakness.

Application 120 may process the logical dependencies between the network assets shown in the service model (e.g., service model 200) to generate the service risk score based on consideration of the different dimensions of the IT service 110. The security risk solutions described herein can make the service model (e.g., service model 200) underlying the service risk score visible to IT administrators (who may be responsible for vulnerability remediation), for example, on display 15. The IT administrators can utilize the service risk score (and the individual network assets' risk scores) in conjunction with the service model for risk prioritization and remediation of the vulnerabilities.

With renewed reference to FIG. 1, service criticality module 121 in application 120 may include, or have access to, service criticality values that may be assigned by a service provider to different services (e.g., an enterprise resource planning (ERP) service, a vacation portal service, a GitLab service, an SAP DB service, etc.) implemented on network 101. The service criticality value (e.g., between a low 0 and a high 10) assigned to a service by the service provider may, for example, be based on consideration of the relative business importance of the service. For example, the ERP service may be assigned a criticality value of 10 as being of high business importance, and the vacation portal service may be assigned a criticality value of 2 as being of a lower business importance to the service provider.

For determining the asset and service risk scores for a service (e.g., IT service 110), in example implementations, the service criticality module 121 may assign the criticality value assigned to the service by the service provider to each network asset tagged in service model 200 (e.g., network assets at nodes 200a-200r in network 101s) as part of the IT service 110. In other words, all network assets of the service inherit the assigned criticality value of the IT service 110. In some implementations, other criticality value propagation rules for the network assets of an IT service can be used. These other criticality value propagation rules (which may be based on network asset type) may, for example, assign a default criticality value of 10 to an SAP DB asset, and a default criticality value of 9 to webserver assets (instead of the assigned criticality value of the IT service). This variation in the assigned criticality value for network assets of an IT service may be defined through a set of criticality value propagation rules applied by the service criticality module 121.

Each risk dimension for each type of network asset may correspond to a security exposure or vulnerability type detected by the vulnerability and threat detection tools (e.g., vulnerability scanner 111, anti-virus (AV) tool 112, policy compliance tool 113, live threat feeds 114, etc.) that scan computer network 101 to provide vulnerability and security exposure information to application 120. Thus, in the example shown in FIG. 1, where there may be four types of security exposures detected by the deployed vulnerability and threat detection tools, there are four corresponding risk dimensions. The four corresponding risk dimensions may, for example, be labelled Patch Vulnerability, Malware, Policy Non-Compliance, and Public Facing (e.g., Internet Facing), respectively (see e.g., TABLE A below).

For each network asset in network 101s used by the service, relative risk dimension weights may be assigned (e.g., by IT administrators) to the various risk dimensions. The relative risk dimension weights may indicate a relative importance of the contribution of each dimension to a network asset's risk. Table A below shows an example of relative risk dimension weights that may assigned to various network assets (e.g., Computer1, Computer 2, Network, and Firewall) used by IT service 110 for the four risk dimensions—Patch Vulnerability, Malware, Policy Non-Compliance, and Public Facing (e.g., Internet Facing).

TABLE A

| Network Asset Type/Risk Dimension | Patch Vulnerability | Malware | Policy Non-Compliance | Public Facing (e.g., Internet facing) |
|---|---|---|---|---|
| Computer1 | 0.4 | 0.3 | 0.3 | |
| Computer2 | 0.3 | 0.2 | 0.2 | 0.3 |
| Network | | | 1.0 | |
| Firewall | | | 0.7 | 0.3 |

In application 120, module risk dimension weights 123 may include, or have access to, the foregoing relative risk dimension importance weights assigned to the various risk dimensions for determining the network asset risk scores.

Further, the security tools data module 124 in application 120 may include, or have access to, vulnerability information associated with the network assets used by IT service 110. The vulnerability information may be obtained by the various vulnerability and threat detection tools coupled to computer network 101. The vulnerability information associated with the network assets may, for example, include data related to patching vulnerabilities, policy violations, application security, malware, and asset location (e.g., whether a network asset is public facing or not), etc.

Module security tools data 124 may be configured to process the vulnerability information obtained by the various vulnerability and threat detection tools for each network asset to compute a numerical dimension risk value for each risk dimension of the network asset. A dimension risk value may be a function that aggregates the overall vulnerability values reported by the security tools, such as CVSS scores, policy violation scores, etc.

The risk score calculator module 125 in application 120 may include algorithms to calculate, for each network asset used by IT service 110, a weighted sum of the numerical dimension risk values over all the risk dimensions of the individual network asset. Further, each network asset may be assigned an asset importance or criticality value (e.g., the assigned criticality value for assets of a service) indicating an importance of the particular network asset relative to other network assets. The network asset criticality value maybe used to scale the weighted sum of the numerical dimension risk values to obtain an asset risk score for the network asset.

In example implementations, risk score calculator module 125 may calculate an asset risk score for a network asset using equation 1:

ASSET RISK SCORE=ASSET CRITICALITY VALUE*Σ(DIMENSION WEIGHT*DIMENSION RISK VALUE)　　(1)

In application 120, risk score calculator module 125 may be further configured to calculate a service risk score for IT service 110. Risk score calculator module 125 may calculate the service risk score, for example, by aggregating the asset risk scores of all the network assets (e.g., at nodes 200a-200r, model 200) used by IT service 110 in network 101s. In example implementations, the service risk score for IT service 110 may be normalized, for example, by dividing the aggregated asset risk scores by the number of assets with positive (i.e., non-zero) asset risk scores.

A Numerical Example

In a numerical example of the determination of risk scores by module risk score calculator 125, a network asset in network 101s used by IT service 110 may be the web server at node 200q (tagged as "Collection_IIS Webserver 6" in FIG. 2 and referred to as Webserver (200q) in this numerical example). Webserver (200q) may have four risk dimensions—it is a public facing network asset (public facing), it may be susceptible to live threats, vulnerabilities requiring patches may have been identified on this asset (patch vulnerability), and a non-compliance with policy may exist with this asset (policy non-compliance). The four risk dimensions may have risk dimension importance weights of 0.3, 0.1, 0.3 and 0.2, respectively, assigned to them (and recorded, for example, at the risk dimension weights module 123). Further, the four risk dimensions—public facing, malware, patch vulnerability and policy non-compliance, of Webserver (200q) may, for example, have numerical dimension risk values of 1.0, 9.0, 8.1 and 8, respectively, (as calculated or obtained, for example, by security tools data 124). Webserver (200q) may have an assigned asset criticality value of 10 (indicating a high importance of Webserver (200q) relative to other network assets). Using equation 1 and the foregoing example risk dimension weights and dimension risk values, risk score calculator module 125 can calculate the asset risk score for Webserver (200q) to be:

ASSET RISK SCORE=ASSET CRITICALITY VALUE*Σ(DIMENSION WEIGHT*DIMENSION RISK VALUE)=10* (0.3*1+0.1*9.0+0.3*8.1+0.2*8)=52.3.

Further, in the numerical example, another network asset used by IT service 110 may be the Web Application Firewall present at node 200m in network 101s (which is tagged as "F5 BIG-IP on lb-prod-mcr-0.2.calbro.com" at node 200*m* in FIG. 2 and referred to as WAF (200*m*) in this example). WAF (200*m*) like Webserver (200*q*) may have an assigned criticality value of 10 (indicating a high importance of WAF (200*m*) relative to other network assets). WAF (200*m*) may have only a single risk dimension corresponding, for example, to a named patch vulnerability "Vuln-wfl". The vulnerability Vuln-wfl may have a dimension risk value of 4 (and a default dimension weight=1.0).

Using equation (1) and risk dimension weights and dimension risk values of WAF (200*m*), risk score calculator module 125 may calculate the asset risk score for WAF (200*m*), for example, to be:

ASSET RISK SCORE=ASSET CRITICALITY
 VALUE*Σ(DIMENSION
 WEIGHT*DIMENSION RISK VALUE)
 =10*1*4=40.

For purposes of illustration, consider further a simple example in which network assets other than Webserver (200*q*) and WAF (200*m*) in network 101*s* have no asset risks (i.e. asset risks=zero). In this simple example, Webserver (200*q*) and WAF (200*m*) both have risk dimensions weights=1.0, and the service risk score for IT service 110 may be obtained by aggregating the asset risk scores, for example, as:

SERVICE RISK SCORE=ASSET RISK SCORE OF
 Webserver (200q)+ASSET RISK SCORE OF
 WAF (200m)=52.3+40=92.3.

In examples where network assets other than Webserver (200*q*) and WAF (200*m*) have non-zero asset risks, the service risk score may be computed using equation 1 to include the weighted contribution of the non-zero asset risks summed over all network assets.

Further, a normalized service risk score for IT service 110 with the two vulnerable assets—Webserver (200*q*) and WAF (200*m*), may be calculated to be:

=92.3/2=46.15.

An attack surface of service is, for example, the sum of the different points in the network where an unauthorized user can try to enter data to or extract data from the service. The service risk score for IT service 110 calculated by risk score calculator module 125 may represent an attack surface of IT service 110.

With renewed reference to FIG. 1, computer systems (e.g., computer network 101) may have built-in (or pre-existing) security or mitigation controls (e.g., features to close or block network ports, policy controls, etc.) that can be activated while network assets are running without requiring shut down or interruption of the network assets. Activating or implementing one or more of these preexisting security or mitigation controls may secure one or more of the asset vulnerabilities and can reduce the service risk score of IT service 110 and its attack surface.

Security control factors applicator module 126 in application 120 may include or have access to mitigation factors that can be applied to the normalized risk score to account for available preexisting security and mitigation controls in computer network 101. Applying or activating the pre-existing security and mitigation controls in computer network 101 may eliminate or reduce the risk to IT service 110 from some vulnerabilities. For example, IT service 110 may have a high service risk score (calculated by risk score calculator module 125) because it processes credit card transactions. However, IT service 110 may be well protected by applying an existing security control (e.g., Payment Card Industry Data Security Standard (PCI DSS)). Accordingly, modified risk score calculator module 125 may re-compute the normalized service risk score after applying the security control. The recomputed normalized service risk score may be referred to as the modified service risk score for the IT service 110.

Prioritization simulator module 128 in application 120 may be configured to recommend prioritization schedules for remediation of network asset vulnerabilities in computer network 101 to secure IT service 110. In example implementations, module prioritization simulator 128 may be configured to simulate the effect of different remediation schedules on the service risk score (normalized or modified service risk scores) of IT service 110. The simulations may take into account vulnerability interdependencies by considering the effects of each remediation action on multiple network asset vulnerabilities. Prioritization simulator module 128 may prioritize and recommend a schedule of remediation actions according to the simulated effect of the remediation actions on lowering the service risk score. The effect of known remediation actions may be considered on a per network asset basis. In the simulations, the service risk score may be computed for each remediation action and the one that results in the largest reduction in service risk may be recommended as the first remediation action to be implemented.

As an illustrative example of the effect of a remediation action on multiple network asset vulnerabilities, consider a simulation scenario in which two assets (e.g., the web server (IIS Webserver) at node 200*j*, and the WAF (F5 BIG-IP on lb-prod-mcr-0.2.calbro.com) at node 200*m* are network assets at risk in network 101*s*. The two assets (referred to as Webserver (200*j*) and WAF (200*m*) in this example) may both have criticality values equal to 10 indicating high importance.

Further, Webserver (200*j*) may, for example, have five risks:
 a. Patch vulnerability: CVE-WannaCry
 b. Patch vulnerability: CVE2013-001
 c. Asset misconfiguration: Port 445 open
 d. Asset location: Public facing
 e. Network environment: Live threats, Malware
Further, WAF (200*m*) may, for example, have one risk:
 f. Patch vulnerability: Vuln-wfl
Some of the risks listed above may be interrelated. For example, WannaCry malware tries to spread by infecting hosts that have port 445 (a traditional Microsoft networking port) open to the Internet with a version of Server Message Block (SMB) and running an unpatched version of Windows on the hosts.

Webserver (200*j*) may, for example, have an asset risk score of 60 and WAF (200*m*) may, for example, have an asset risk score of 40 as determined by risk score calculator module 125. The service risk score for IT service 110 may be obtained by aggregating the asset risk scores, for example, as:

SERVICE RISK SCORE=ASSET RISK SCORE OF
 Webserver (200j)+ASSET RISK SCORE OF
 WAF (200m)=60+40=100.

Further, an initial normalized service risk score for IT service 110 with the two vulnerable assets—Webserver (200*j*) and WAF (200*m*), may be calculated to be:

=100/2=50.

Activating a remediation action for the asset Webserver (200*j*) (i.e., a policy control of blocking open port 445) may not only remedy a first vulnerability (i.e., Port 445 open), but may also remedy a second vulnerability (i.e., CVE-Wanna-Cry) by blocking WannaCry malware's attack path to Webserver (200j) via open port 445.

After the remedy of blocking open port 445 is applied in the simulation, Webserver (200j) may, for example, have an asset risk score of 30 as determined by risk score calculator module 125 leading to a determination that IT service 110 now has a reduced normalized service risk score:

=(30+40)/2=35.

Prioritization simulator module 128 in application 120 may be configured to perform "what-if" simulations of known remediation actions on a per network asset basis, such as described in the foregoing simulation scenario. The service risk score may be recomputed after applying each available remediation action in the simulation. A remediation action that results in a large reduction in the service risk score may be recommended for securing a service (e.g., IT service 110) with a higher priority than other remediation actions that result in smaller reductions in the service risk score. A sequence of recommended remediation actions may be optimized to obtain the lowest service risk score for securing a service (e.g., IT service 110).

Table B shows an example sequence of three prioritized remediation actions (e.g., Modify Policy control to block port 445, Patch CVE-2013-001, and Patch Vuln-wfl) that may be recommended by prioritization simulator module 128 in the above-discussed simulation scenario involving the two network assets—Webserver (200j) and WAF (200m). The three remediation actions are individually listed in Table B as priority 1, priority 2, and priority 3 according to the expected reductions in the service risk score on applying the individual remediation action.

TABLE B

| Priority | Remediation Action | Service Risk Reduction |
|---|---|---|
| #1 | Modify Policy control to block port 445 on webserver (200j) and WAF (200m) | 50 to 35 |
| #2 | Patch CVE-2013-001 on webserver (200j) | 35 to 14 |
| #3 | Patch Vuln-wfl on WAF (200m) | 14 to 0 |

Figure 3:
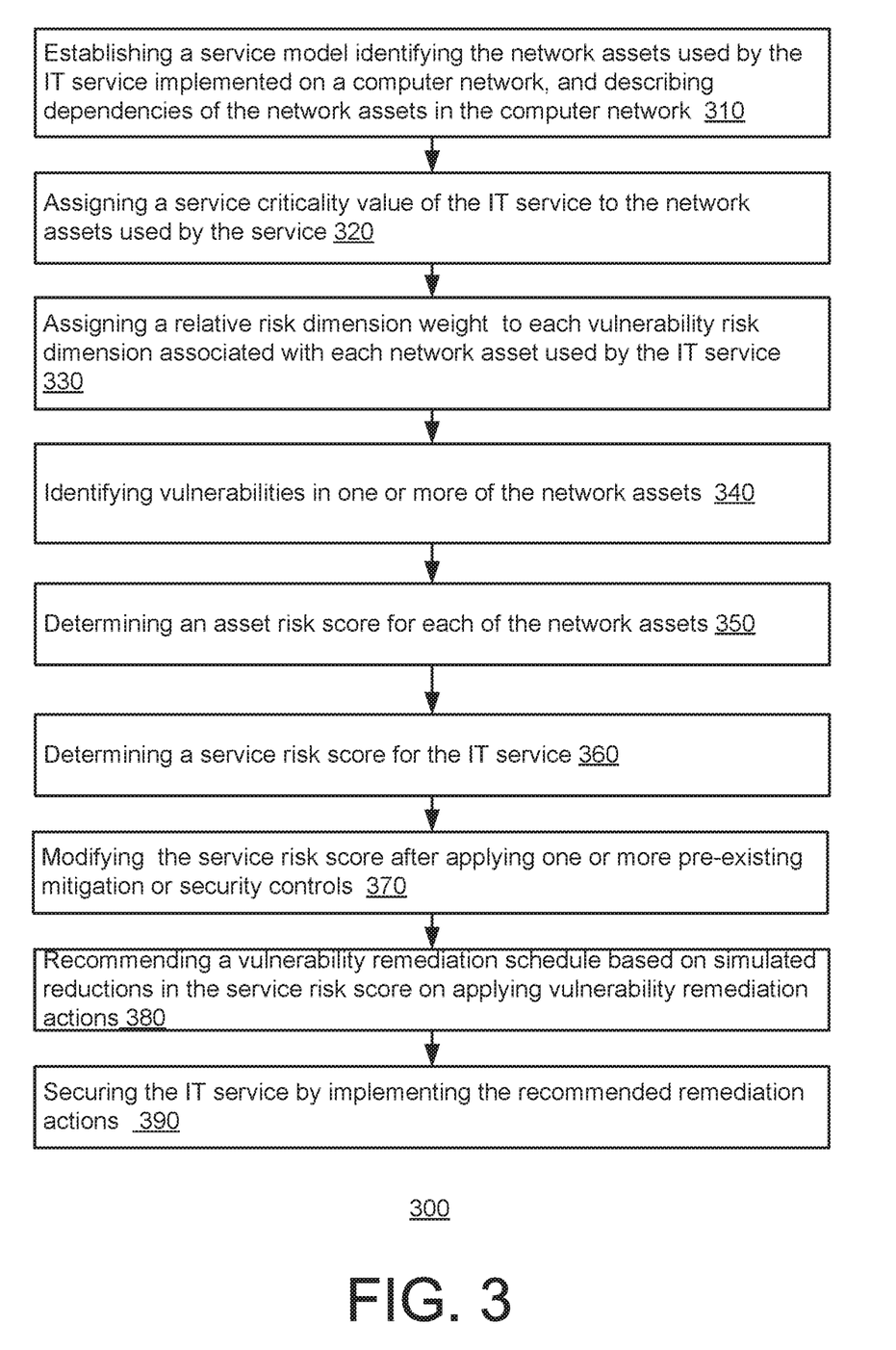
FIG. 3 is an illustration of an example method for identifying security risks of an IT service arising from network vulnerabilities and recommending a schedule for remediation of the network vulnerabilities in accordance with the principles of the present disclosure.

FIG. 3 shows an example method 300 for identifying security risks of an IT service (e.g., IT service 110) arising from vulnerabilities and recommending a schedule for remediation of the vulnerabilities.

Method 300 includes establishing a service model identifying the network assets used by the IT service implemented on a computer network, and describing dependencies of the network assets in the computer network (310), assigning a service criticality value of the IT service to the network assets used by the service (320), assigning a relative risk dimension weight to each vulnerability risk dimension associated with a network asset used by the IT service (330), and identifying one or more vulnerabilities in each of the network assets (using, e.g., network security scanning tools) (340). Identifying the vulnerabilities may include determining risk values for each of the risk dimensions associated with the network asset using information gathered by the network security scanning tools (e.g., Qualys, Nessus, or Rapid7, BMC's SecOPS Policy service, live threat feeds, etc.).

Method 300 further includes determining an asset risk score for each of the network assets (350), determining a service risk score (360), and modifying the service risk score after applying one or more pre-existing mitigation or security controls (370).

Method 300 may further include recommending a vulnerability remediation schedule based on simulated reductions in the service risk score on applying vulnerability remediation actions (380).

Method 300 may involve what-if simulations of the effect of a set of remediation actions (on a per asset basis) on the service risk score. A set of remediation actions may be recommended for implementation to secure the service. A remediation action which results in a larger reduction in the service risk score may be prioritized over other remediation actions that result in smaller reductions in the service score.

Method 300 may include securing the IT service by implementing the recommended remediation actions (390).

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatuses, e.g., programmable processors or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the processing of a computer program include, by way of example, both general and special purpose microprocessors, and any one or more processors of any kind of digital computer. Generally, a processor will receive instructions and data from a read-only memory or a random-access memory or both. Elements of a computer may include at least one processor for executing instructions and one or more memory devices for storing instructions and data. Generally, a computer also may include, or be operatively coupled to receive data from or transfer data to, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computer network that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communications network. Examples of communications networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that the described implementations have been presented by way of example only, not limitation, and various changes in form and details may be made. Any portion of the apparatuses and/or methods described herein may be combined in any combination, except mutually exclusive combinations. The implementations described herein can include various combinations and/or sub-combinations of the functions, components and/or features of the different implementations described.

What is claimed is:

1. A method for securing a service implemented on a computer network, the method comprising:
    identifying network assets in the computer network used by the service;
    identifying vulnerabilities in one or more of the network assets, each vulnerability having one or more vulnerability risk dimensions weighted by a risk value for each of the vulnerability risk dimensions;
    based on the identified vulnerabilities, determining an asset risk score for each of the network assets by applying a criticality value to a sum of the one or more vulnerability risk dimensions as weighted by the risk value for each of the vulnerability risk dimensions;
    based on the determined asset risk scores of the network assets, determining a service risk score for the service;
    prioritizing implementation of a plurality of vulnerability remediation actions in a priority order based on effects on the service risk score, wherein the priority order is based on a reduction of the service risk score; and
    implementing one or more of the plurality of vulnerability remediation actions based on the priority order.

2. The method of claim 1, wherein identifying network assets in the computer network used by the service includes describing dependencies of the network assets in the computer network.

3. The method of claim 1, further comprising:
    simulating the effects of the plurality of vulnerability remediation actions on the service risk score.

4. The method of claim 1, wherein the one or more vulnerability risk dimensions correspond to a vulnerability type detected by one or more network security tools.

5. The method of claim 1, wherein the risk value for each vulnerability risk dimension includes information obtained from one or more network security tools.

6. The method of claim 1, further comprising assigning the criticality value to each of the network assets using criticality value propagation rules.

7. The method of claim 6, wherein determining the service risk score for the service includes aggregating the asset risk scores of the network assets used by the service.

8. A computer system to secure a service implemented on a computer network, the computer system comprising:
    a computing device including at least one processor and at least one memory, the at least one memory including instructions that, when executed by the at least one processor, cause the at least one processor to implement:
    a service model module configured to identify network assets in the computer network used by the service;
    a security tools data module configured to receive data identifying vulnerabilities in one or more of the network assets, each vulnerability having one or more vulnerability risk dimensions weighted by a risk value for each of the vulnerability risk dimensions;
    a risk score calculator configured to determine an asset risk score for each of the network assets used by the service based on the identified vulnerabilities and to determine a service risk score for the service based on the determined asset risk score of each of the network assets by applying a criticality value to a sum of the one or more vulnerability risk dimensions as weighted by the risk value for each of the vulnerability risk dimensions; and
    a prioritization simulator configured to:
    prioritize implementation of a plurality of vulnerability remediation actions in a priority order based on effects on the service risk score, wherein the priority order is based on a reduction of the service risk score; and
    implement one or more of the plurality of vulnerability remediation actions based on the priority order.

9. The computer system of claim 8, wherein the service model module is configured to identify dependencies of the network assets in the computer network used by the service.

10. The computer system of claim 8, wherein the prioritization simulator is further configured to:
    simulate the effects of the plurality of vulnerability remediation actions on the service risk score.

11. The computer system of claim 8, wherein the one or more vulnerability risk dimensions correspond to a vulnerability type detected by one or more network security tools.

12. The computer system of claim 8, wherein the risk value for each vulnerability risk dimension includes information obtained from one or more network security tools.

13. The computer system of claim 8, wherein the risk score calculator is configured to assign the criticality value to each of the network assets using criticality value propagation rules.

14. The computer system of claim 8, wherein the risk score calculator is configured to determine the service risk score for the service by aggregating the asset risk scores of the network assets used by the service.

15. A computer program product including instructions recorded on a non-transitory computer-readable storage medium and configured to cause at least one processor to secure a service implemented on a computer network, the instructions including instructions that when executed by the at least one processor cause the at least one processor to:

identify network assets in the computer network used by the service;

identify vulnerabilities in one or more of the network assets, each vulnerability having one or more vulnerability risk dimensions weighted by a risk value for each of the vulnerability risk;

based on the identified vulnerabilities, determine an asset risk score for each of the network assets by applying a criticality value to a sum of the one or more vulnerability risk dimensions as weighted by the risk value for each of the vulnerability risk dimensions;

based on the determined asset risk scores of the network assets, determine a service risk score for the service;

prioritize implementation of a plurality of vulnerability remediation actions in a priority order based on effects on the service risk score, wherein the priority order is based on a reduction of the service risk score; and implement one or more of the plurality of vulnerability remediation actions based on the priority order.

16. The computer program product of claim 15, wherein the instructions include instructions that, when executed, cause the at least one processor to:

include descriptions of dependencies of the network assets in the computer network when identifying the network assets in the computer network used by the service.

17. The computer program product of claim 15, wherein the instructions include instructions that, when executed, cause the at least one processor to:

simulate the effects of the plurality of vulnerability remediation actions on the service risk score.

18. The computer program product of claim 15, wherein the one or more vulnerability risk dimensions correspond to a vulnerability type detected by one or more network security tools.

19. The computer program product of claim 15, wherein the risk value for each vulnerability risk dimension includes information obtained from one or more network security tools.

20. The computer program product of claim 18, further comprising instructions that, when executed, cause the at least one processor to:

assign the criticality value to each of the network assets using criticality value propagation rules.

21. The computer program product of claim 15, wherein the instructions include instructions that, when executed, cause the at least one processor to:

determine the service risk score for the service by aggregating the asset risk scores of the network assets used by the service.

* * * * *

UNITED STATES PATENT AND TRADEMARK OFFICE
CERTIFICATE OF CORRECTION

PATENT NO. : 11,677,773 B2
APPLICATION NO. : 16/194735
DATED : June 13, 2023
INVENTOR(S) : Iyer et al.

Page 1 of 1

It is certified that error appears in the above-identified patent and that said Letters Patent is hereby corrected as shown below:

In the Claims

In Column 17, Claim 15, Line 6, delete "risk;" and insert -- risk dimensions; --, therefor.

Signed and Sealed this
Twenty-sixth Day of September, 2023

Katherine Kelly Vidal
*Director of the United States Patent and Trademark Office*